(12) United States Patent
Kuroumaru et al.

(10) Patent No.: US 7,600,602 B2
(45) Date of Patent: Oct. 13, 2009

(54) MOTOR-DRIVEN POWER STEERING APPARATUS

(75) Inventors: Yoshikazu Kuroumaru, Kashiwara (JP); Shirou Nakano, Minamikawachi-gun (JP); Katsutoshi Nishizaki, Nabari (JP)

(73) Assignee: JTEKT Corporation, Osaka (JP)

( * ) Notice: Subject to any disclaimer, the term of this patent is extended or adjusted under 35 U.S.C. 154(b) by 487 days.

(21) Appl. No.: 10/596,285

(22) PCT Filed: Nov. 30, 2004

(86) PCT No.: PCT/JP2004/017790

§ 371 (c)(1), (2), (4) Date: Jun. 8, 2006

(87) PCT Pub. No.: WO2005/056367

PCT Pub. Date: Jun. 23, 2005

(65) Prior Publication Data

US 2007/0170787 A1    Jul. 26, 2007

(30) Foreign Application Priority Data

Dec. 8, 2003    (JP) .............................. 2003-409449

(51) Int. Cl.
H02K 37/14 (2006.01)
(52) U.S. Cl. ........................................ 180/444; 180/443
(58) Field of Classification Search .................. 180/443, 180/444

See application file for complete search history.

(56) References Cited

U.S. PATENT DOCUMENTS 5,010,970 A    4/1991    Yamamoto et al.
5,341,699 A    8/1994    Rouverol

FOREIGN PATENT DOCUMENTS

| DE | 4101810 | | 7/1992 |
|---|---|---|---|
| JP | 63-46281 U | | 3/1988 |
| JP | 11-124045 A | | 5/1999 |
| JP | 11124045 A | * | 5/1999 |
| JP | 2000-130560 A | | 5/2000 |
| JP | 2001-133343 A | | 5/2001 |
| JP | 2001-271889 A | | 10/2001 |

OTHER PUBLICATIONS

International Search Report for PCT/JP2004/017790 mailed Mar. 1, 2005.

* cited by examiner

*Primary Examiner*—Lesley D Morris
*Assistant Examiner*—Jacob Knutson
(74) *Attorney, Agent, or Firm*—Darby & Darby P.C.

(57) ABSTRACT

The invention provides a motor-driven power steering apparatus which can achieve a predetermined speed reduction ratio even in the case that the motor-driven power steering apparatus is constituted by a pair of spur gears or helical gears, and can secure a sufficient gear strength on the basis of a simple structure. In a motor-driven power steering apparatus in which a rotating torque of an electric motor (7) is transmitted to a steering shaft by a drive gear (6) provided in an output shaft of the electric motor (7) and a driven gear (5) provided in the steering shaft, and a speed reduction ratio is equal to or more than 3, the steering shaft and the output shaft of the electric motor (7) are arranged in almost parallel, a center distance between both the shafts is equal to or more than 35 mm and equal to or less than 90 mm, and the drive gear (6) is configured such that a number of teeth is equal to or more than 6 and equal to or less than 15, a module is equal to or more than 0.8 and equal to or less than 1.5, a tooth depth is equal to or less than 2.4 times of the module, and a pressure angle is equal to or more than 14.5 degrees and equal to or less than 30 degrees, and a torsion angle is equal to or more than 0 degrees and equal to or less than 40 degrees.

4 Claims, 5 Drawing Sheets

F I G. 3
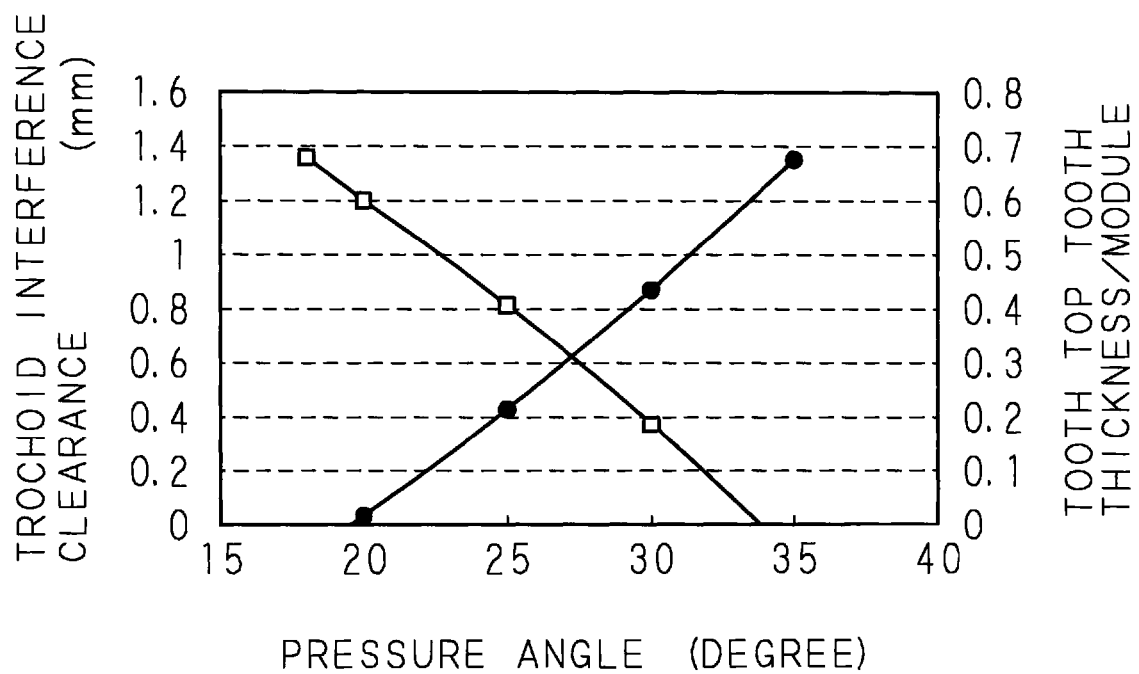

F I G. 4
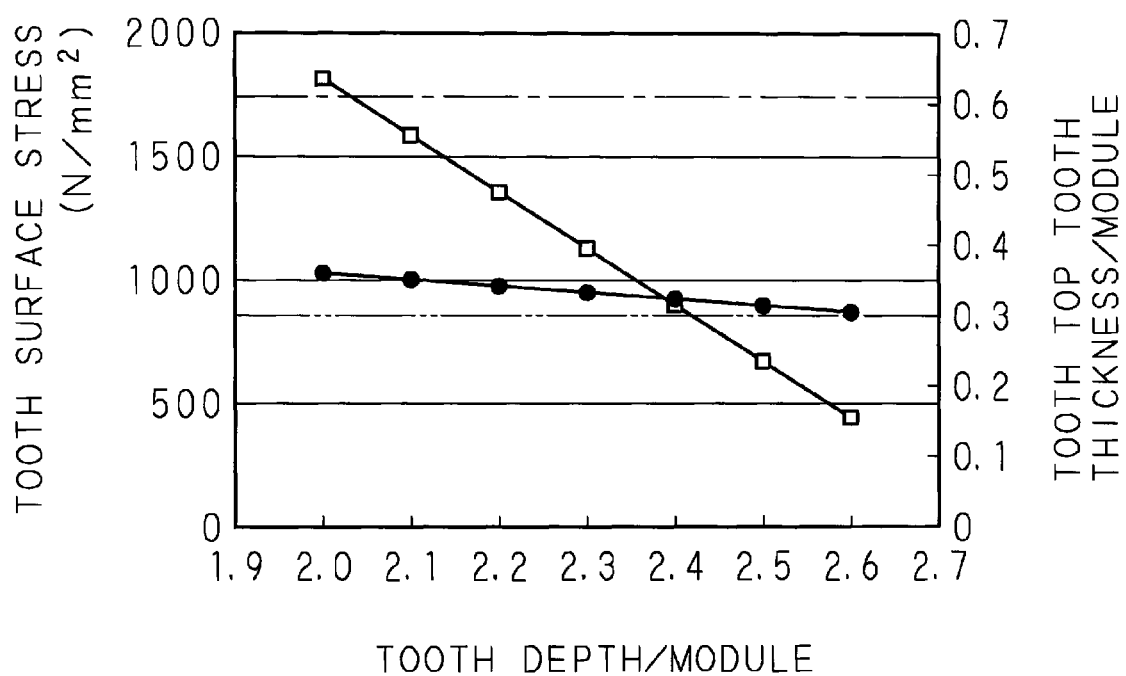

MOTOR-DRIVEN POWER STEERING APPARATUS

CROSS-REFERENCE TO PRIOR APPLICATION

This is a U.S. National Phase Application under 35 U.S.C. §371 of International Patent Application No. PCT/JP2004/017790 filed Nov. 30, 2004, and claims the benefit of Japanese Patent Application No. 2003-409449 filed Dec. 8, 2003 both of which are incorporated by reference herein. The International Application was published in Japanese on Jun. 23, 2005 as WO 2005/056367 A1 under PCT Article 21(2).

TECHNICAL FIELD

The present invention relates to a motor-driven power steering apparatus transmitting a rotating torque of an electric motor to a steering shaft by a drive gear provided in an output shaft of the electric motor and a driven gear provided in the steering shaft.

BACKGROUND ART

In a steering apparatus for a motor vehicle in recent days, a motor-driven power steering apparatus making good use of an electric motor is well employed as a steering assist mechanism. The motor-driven power steering apparatus transmits a rotating torque of the electric motor to a steering shaft via a worm gear.

However, in the worm gear, since a transmission efficiency of the rotating torque is comparatively low such as 60 to 80%, in the case that a speed reduction ratio is set constant, an electric motor having a larger output torque is necessary for transmitting a predetermined rotating torque. Accordingly, there is a problem that an outer diameter of the electric motor becomes large and it is hard to make an entire of the steering apparatus compact. Therefore, there has been designed a speed reducer in which the output shaft of the electric motor is attached in such a manner as to be in almost parallel to the steering shaft, and which uses a spur gear or a helical gear in which the transmission efficiency of the rotating torque is comparatively high.

In the case of using the spur gear or the helical gear for the speed reducer, the transmission efficiency of the rotating torque becomes comparatively high such as about 95%. Accordingly, it is possible to reduce the output torque of the electric motor at that degree, and it is possible to make the entire of the steering apparatus compact by suppressing an enlargement of an outer shape of the electric motor.

However, in the case of employing the speed reducer, for example, using the spur gear, if it is intended to obtain a necessary speed reduction ratio on the basis of a one-stage structure of the gear provided in the output shaft of the electric motor, and the gear attached to the steering shaft engaging with the gear, a pitch circle of the steering shaft side gear becomes large, and it is impossible to improve the condition that it is hard to intend to make the entire of the steering apparatus compact.

On the other hand, in the case of employing a speed reducer having a multi-stage structure, for example, having intermediate gears, in place of the speed reducer having the one-stage structure, as the speed reducer using the spur gear, it is possible to intend to make the entire of the steering apparatus compact, however, there is generated a new problem that a comfortable steering feeling is reduced due to an increase of a backlash, a cost increase due to a complication of the structure of the speed reducer or the like.

In order to solve the problem mentioned above, for example, Japanese Patent Application Laid-Open No. 11-124045 discloses a motor-driven power steering apparatus in which an entire of a steering apparatus having an electric motor and a speed reducer arranged therein can be made compact by accommodating a speed reducer constituted by a pair of spur gears or helical gears having a high speed reduction ratio within a housing, and arranging the electric motor close to the housing in which a steering shaft is accommodated.

In the motor-driven power steering apparatus disclosed in the Japanese Patent Application Laid-Open No. 11-124045, since it is hard to secure a strength of the gear on the basis of a normal involute tooth profile, a strength of a tooth surface is secured by employing a tooth profile based on a predetermined special theory.

DISCLOSURE OF THE INVENTION

Problem to be Solved by the Invention

However, it is hard in structure to actually manufacture the tooth profile based on the special theory disclosed in the Japanese Patent Application Laid-Open No. 11-124045, and there comes into question whether or not it is possible to stably supply a speed reducer having a high quality in a mass production line. In other words, since there is employed the tooth profile based on the special theory, a performance of the speed reducer tends to be strongly affected by an alignment error of the gear. Accordingly, a high processing precision and a high assembling precision are required in the mass production line. Further, there are a lot of problems remaining for being actually changed to the mass production line, such as it is impossible to process by an existing manufacturing equipment, an inspection method of the processing precision is not established, and the like.

The present invention is made by taking the circumstance mentioned above into consideration, and an object of the present invention is to provide a motor-driven power steering apparatus which can achieve a predetermined speed reduction ratio even in the case that the motor-driven power steering apparatus is constituted by a pair of spur gears or helical gears, and can secure a sufficient gear strength on the basis of a simple structure.

Means for Solving the Problem

In order to achieve the object mentioned above, in accordance with a first aspect of the present invention, there is provided a motor-driven power steering apparatus in which a rotating torque of an electric motor is transmitted to a steering shaft by a drive gear provided in an output shaft of the electric motor and a driven gear provided in the steering shaft, and a speed reduction ratio is equal to or more than 3, wherein the steering shaft and the output shaft of the electric motor are arranged in almost parallel, a center distance between both the shafts is equal to or more than 35 mm and equal to or less than 90 mm, and the drive gear is configured such that a number of teeth is equal to or more than 6 and equal to or less than 15, a module is equal to or more than 0.8 and equal to or less than 1.5, a tooth depth is equal to or less than 2.4 times of the module, and a pressure angle is equal to or more than 14.5 degrees and equal to or less than 30 degrees, and a torsion angle is equal to or more than 0 degrees and equal to or less than 40 degrees.

In the motor-driven power steering apparatus in accordance with the first aspect of the present invention, since there is employed a pair of gears in which steering shaft and the output shaft of the electric motor are in almost parallel, a transmission efficiency of the rotating torque is high, and it is possible to arrange the entire of steering apparatus compact. Further, on the basis of the data dimensions mentioned above, even in the case of using the gear which can be manufactured in the normal manufacturing step without using the tooth profile based on the predetermined special theory, it is possible to secure correct values of a trochoid interference clearance, a tooth thickness of a tooth top and a tooth surface stress.

Further, in accordance with a second aspect of the present invention, there is provided a motor-driven power steering apparatus as recited in the first aspect, wherein an involute gear in which a tooth profile is configured in such a manner that a pressure angle is increased from a tooth top of the gear to a tooth root is employed for one or both of the drive gear and the driven gear.

In the motor-driven power steering apparatus in accordance with the second aspect of the present invention, it is possible to reduce a tooth root stress at a time when a maximum torque is applied, by employing the involute gear in which the tooth profile is formed in such a manner that the pressure angle is increased from the tooth top of the gear to the tooth root, and it is possible to secure a durability of the gear.

Further, in accordance with a third aspect of the present invention, there is provided a motor-driven power steering apparatus as recited in the first or second aspect, wherein an involute gear in which a crowning process is applied in a direction of a tooth trace is employed for one or both of the drive gear and the driven gear.

In the motor-driven power steering apparatus in accordance with the third aspect of the present invention, since the involute gear in which the crowning process is applied in the direction of the tooth trace is employed, the tooth surface stress can be reduced. Accordingly, even in the case that a continuous operation is executed under a rated load condition, it is possible to secure a durability of the gear.

Effect of the Invention

In accordance with the present invention, since there is employed a pair of gears in which the steering shaft and the output shaft of the electric motor are in almost parallel, it is possible to obtain the motor-driven power steering apparatus in which the transmission efficiency of the rotating torque is high, and which is arranged compact as a whole. Further, on the basis of the data dimensions mentioned above, it is possible to secure the correct values of the trochoid interference clearance, the tooth thickness of the tooth top and the tooth surface stress, without employing the tooth profile based on the predetermined special theory.

BRIEF DESCRIPTION OF THE DRAWINGS

FIG. 3 is a view showing a relation among a pressure angle, a trochoid interference clearance of the small gear, and a tooth thickness of a tooth top;

FIG. 4 is a view showing a relation between a tooth surface stress with respect to a tooth depth of the small gear and a tooth thickness of the tooth top.

Figure 1:
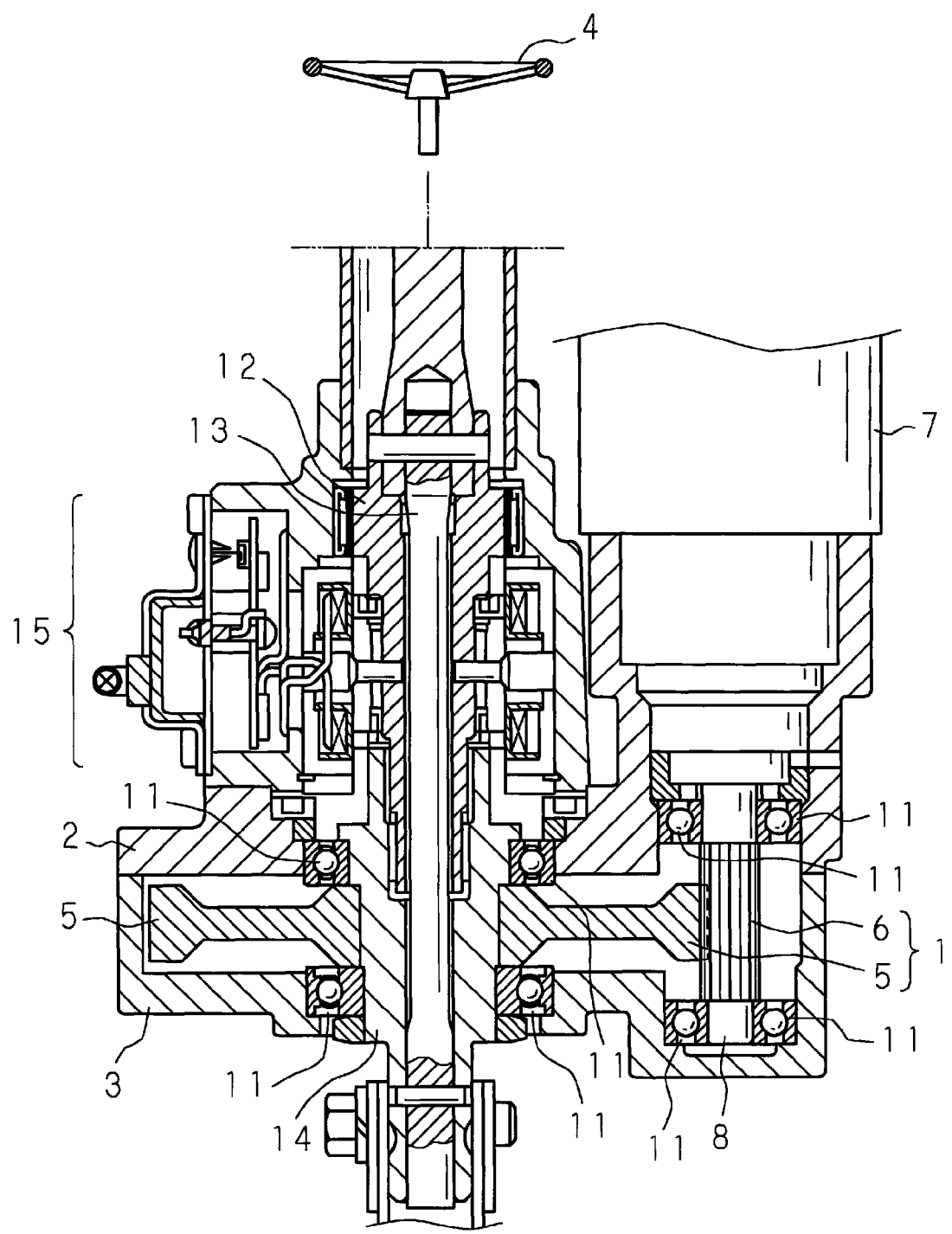
FIG. 1 is a cross sectional view showing a schematic structure of a motor-driven power steering apparatus in accordance with an embodiment of the present invention.

| Description of Reference Numerals | |
|---|---|
| 1 | speed reducer |
| 5 | large gear (driven gear) |
| 6 | small gear (drive gear) |
| 7 | electric motor |
| h | tooth depth |
| m | module |
| L | center distance |
| Z | number of teeth |
| α | pressure angle |

BEST MODE FOR CARRYING OUT THE INVENTION

FIG. 1 is a cross sectional view showing a schematic structure of a motor-driven power steering apparatus in accordance with an embodiment of the present invention. As shown in FIG. 1, the structure is made such that a steering torque acting on a steering member 4 is transmitted to a steered wheel side via a steering shaft constituted by an input shaft 12, a torsion bar 13 and an output shaft 14, and a rotating torque of an electric motor 7 is transmitted to the steered wheel side via a speed reducer 1 constituted by a small gear (a drive gear) 6 and a large gear (a driven gear) 5, and the output shaft 14 of the steering shaft.

The input shaft 12 is coupled to the steering member 4, and corresponds to one constituting element of a torque transmission means for transmitting the steering torque acting on the steering member 4 to the steered wheel side. The input shaft 12 is configured such that one end side is supported via a bearing (not shown), and the other end side is coupled to the torsion bar 13.

The torsion bar 13 couples the input shaft 12 and the output shaft 14, and generates a torsional deformation on the basis of the steering torque, thereby generating a relative displacement of rotating angle between the input shaft 12 and the output shaft 14.

The output shaft 14 is configured such that one end side is supported via bearings 11, 11, . . . , and the other end side is coupled to the torsion bar 13. The output shaft 14 transmits the steering torque from the torsion bar 13 to the steered wheel side, and transmits the rotating torque of the electric motor 7 transmitted from the speed reducer 1 to the steered wheel side. Accordingly, the input shaft 12 and the output shaft 14 are elastically and relatively rotated in correspondence to the steering torque and are coaxially coupled.

A torque detecting mechanism 15 is configured such as to detect the relative displacement of rotating angle between the output shaft 14 and the input shaft 12 generated due to the torsion of the torsion bar 13 by the steering torque, thereby detecting the steering torque.

The speed reducer 1 is configured by a spur gear or a helical gear which is provided with the large gear 5 provided in the output shaft 14 of the steering shaft, and the small gear 6 provided in the output shaft of the electric motor 7. It is possible to arrange the electric motor 7 in almost parallel to the steering shaft, by employing the spur gear or the helical gear. However, a physical restriction on a layout is generated in an outside dimension of the electric motor 7 in correspondence to a center distance L between the steering shaft and the output shaft of the electric motor 7. For example, in the case that the maximum allowable outside dimension of the electric motor 7 is constituted by a diameter 73 mm and a height 95 mm, on the basis of the restriction on the layout, in order to secure a rotating torque equal to or more than 35 Nm for a steering assist torque around the steering shaft, a rating torque is set to 4 Nm, the center distance L is set to 55 mm, and a speed reduction ratio is set to about 10.

Figure 2:
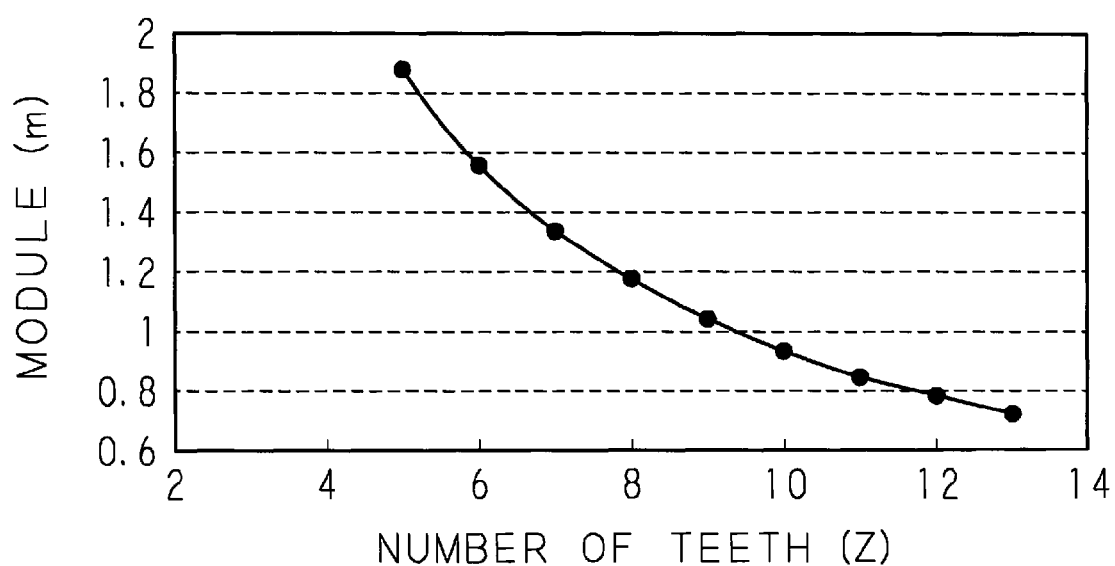
FIG. 2 is a view showing a relation between a number of teeth of a small gear and a module of the small gear.

FIG. 2 is a view showing a relation between a number of teeth Z of the small gear 6 and a module m of the small gear 6 in the case that the center distance L between the steering shaft and the output shaft of the electric motor 7 is set to 55 mm, the speed reduction ratio is set to 10, and a torsion angle β is set to 25 degrees. A diameter d (=Z×m) of a pitch circle of the small gear 6 is about 8 to 10 mm, however, in order to avoid a condition that the number of teeth is extremely large or extremely small, a practical range exists in the number of teeth Z equal to or more than 6 and equal to or less than 15, and the module m equal to or more than 0.8 and equal to or less than 1.5.

Next, taking into consideration a manufacturing error of the gear, and an elastic deformation of the tooth of the gear in the case of executing the rated load operation, a pressure angle α setting a trochoid interference clearance and a tooth thickness of a tooth top to correct values is selected. FIG. 3 is a view showing a relation among the pressure angle α of the small gear 6, the trochoid interference clearance and the tooth width of the tooth top in the case that the number of teeth Z is 10, the module m is 0.95 and a tooth depth h is 2.25 times of the module m. In FIG. 3, a circle mark indicates a trochoid interference clearance, and a rectangle mark indicates a value obtained by dividing the tooth thickness of the tooth top by the module value, respectively.

In order to avoid the trochoid interference from being generated, the trochoid interference clearance equal to or more than 0.2 mm is necessary. As shown in FIG. 3, in the case that the pressure angle α is equal to or more than 14.5 degrees and equal to ore less than 35 degrees which is defined as a standard value in Japanese Industrial Standards (JIS), the trochoid interference clearance becomes equal to or more than 0.2 mm in a region where the pressure angle α is equal to or more than 23 degrees. Accordingly, the trochoid interference is not generated. On the other hand, in order to secure a tooth top strength, the tooth thickness of the tooth top equal to or more than 0.3 times of the module m is necessary. As shown in FIG. 3, in order to secure the tooth thickness of the tooth top equal to or more than 0.3 times of the module m, it is necessary to set the pressure angle α to be equal to or less than 27 degrees. In this case, the practical range exists in the torsion angle β equal to or more than 0 degrees and equal to or less than 40 degrees.

Further, in the case that a steel material is employed as a material of the small gear 6 and the large gear 5, it is possible to approximately determine a tooth surface stress $\sigma_H$ with respect to a tangential load $P_n$ in a perpendicular direction to the tooth of the small gear 6 generated on the basis of an auxiliary rotating torque by using (numerical expression 1).

$$\sigma_H = \sqrt{P_n \left[\frac{Z_1 + Z_2}{Z_2}\right] \frac{0.35 \cdot E \cdot \cos^2\beta_g}{N_b \cdot \varepsilon_s \cdot b \cdot d_b \cdot \sin\alpha_b}}$$ [numerical expression 1]

In this case, in (numeral expression 1), reference symbol E denotes a longitudinal elastic modulus of a material (a steel material in the present embodiment) of the gear, reference symbol $\varepsilon_s$ denotes a front surface contact ratio, reference symbol b denotes a tooth width of the small gear 6, reference symbol $d_b$ denotes a mating pitch circle diameter of the small gear 6, reference symbol $\alpha_b$ denotes a mating pressure angle of the small gear 6, reference symbol $\beta_g$ denotes a torsion angle of a base cylinder of the small gear 6, reference symbol $Z_1$ denotes a number of teeth of the small gear 6, reference symbol $Z_2$ denotes a number of teeth of the large gear 5, and reference symbol $N_b$ denotes an availability of the tooth width, respectively.

FIG. 4 is a view showing a relation of the tooth surface stress $\sigma_s$ and the tooth thickness of the tooth top with respect to the tooth depth h of the small gear 6, in the case of setting E to 206000 N/mm$^2$, $P_n$ to 946, $N_b$ to 14 mm, $Z_1$ to 10, $Z_2$ to 97, m to 0.95, the pressure angle α to 25 degrees, the torsion angle β to 25 degrees, $d_b$ to 10.308 mm, $\alpha_b$ to 25.283 degrees, $\beta_g$ to 22.521 degrees, and $N_b$ to 0.995. In FIG. 4, a circle mark indicates a tooth surface stress, and a rectangle mark indicates a value obtained by dividing the tooth thickness of the tooth top by the module value, respectively.

In the case of setting a target value of the tooth surface stress $\sigma_H$ to a threshold value 1760 N/m$^2$ or less on design of a power transmission system gear of a motor vehicle, and setting a target value of the tooth thickness of the tooth top to 0.3 times of the module m or more, it is possible to satisfy both the conditions in the case that the tooth depth h is set to equal to or less than 2.4 times of the module m, as is apparent from FIG. 4.

Figure 5:
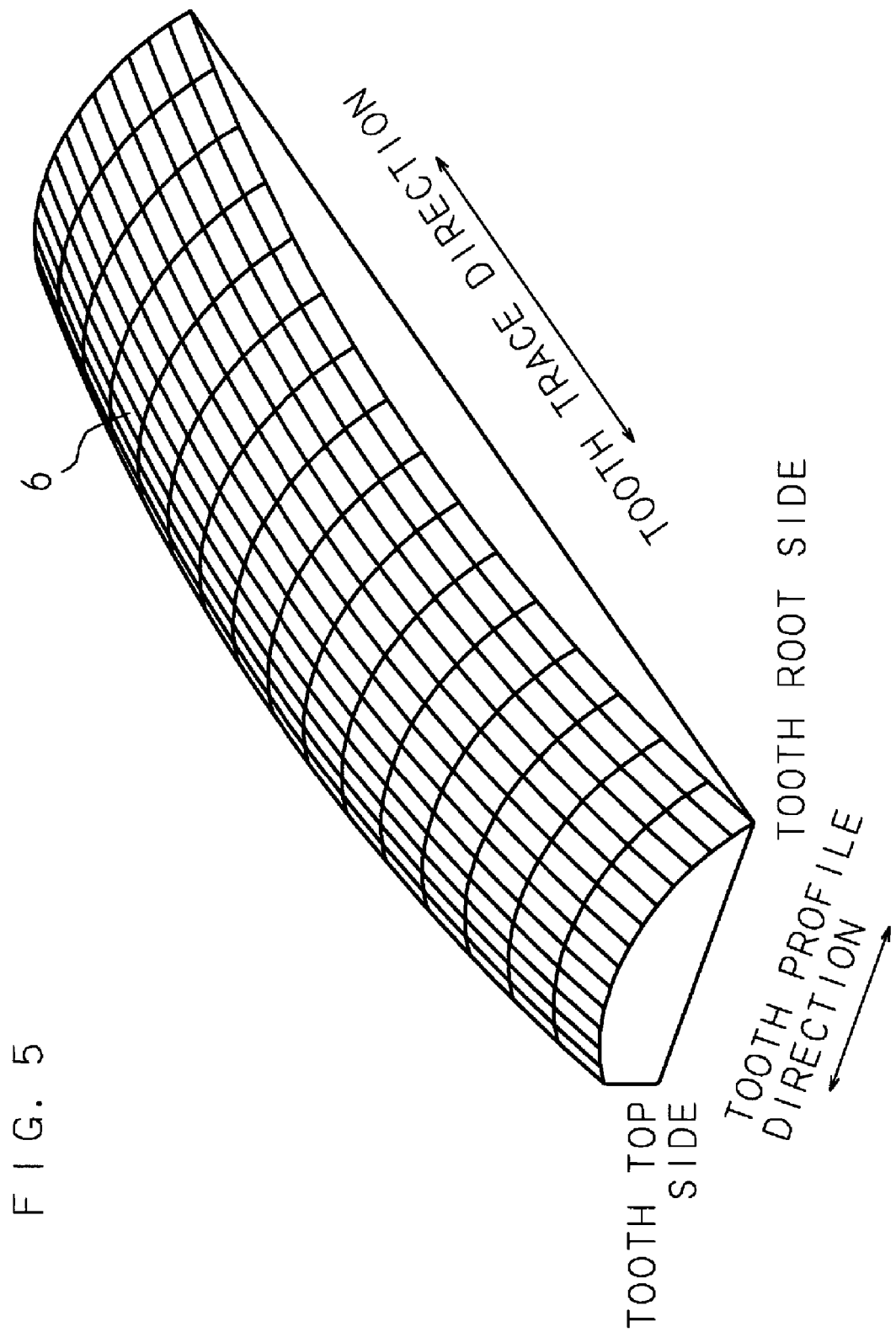
FIG. 5 is an explanatory view of a tooth surface shape of a speed reducer used in the motor-driven power steering apparatus in accordance with the embodiment of the present invention.

FIG. 5 is an explanatory view of a tooth surface shape of the speed reducer 1 used for the motor-driven power steering apparatus in accordance with the embodiment of the present invention. In order to compensate for the reduction of the tooth root strength, the tooth surface shape of any one of the large gear 5 and the small gear 6, or the tooth surface shapes of both of a pair of gears are formed by an aspect shown in FIG. 5. In FIG. 5, the tooth surface of the small gear 6 is shown by being divided into vertical and horizontal meshes. The tooth profile direction is provided with a negative pressure angle error in such a manner that the pressure angle of the tooth top becomes larger than the pressure angle of the tooth boot, and the tooth surface shape is formed in such a direction that the mutual mating stresses are increased, that is, such that the center portion forms convex. Further, a crowning process is applied in a tooth trace direction, and the tooth surface shape is formed such that the center portion forms convex in the tooth trace direction.

It is possible to equalize a distribution of the contact stress in the tooth surface of the small gear 6 used in the speed reducer 1 in the tooth profile direction and the tooth trace direction by employing the tooth surface shape mentioned above, and it is possible to compensate for the lack of the tooth root strength while preventing a biased abrasion of the tooth surface, thereby contributing to an improvement of a durability.

The invention claimed is:

1. A motor-driven power steering apparatus in which a rotating torque of an electric motor is transmitted to a steering shaft by a drive gear provided in an output shaft of said electric motor and a driven gear provided in said steering shaft, and a speed reduction ratio is equal to or more than 3, wherein said steering shaft and the output shaft of said electric motor are arranged in almost parallel, a center distance between both the shafts is equal to or more than 35 mm and equal to or less than 90 mm, and wherein said drive gear has at least 6 and no more than 15 teeth, a module of said drive gear is at least 0.8 and no more than 1.5, a tooth depth of said drive gear is equal to or less than 2.4 times of the module, a pressure angle of said drive gear is at least 14.5 degrees and no more than 30 degrees, and a torsion angle of said drive gear is at least 0 degrees and no more than 40 degrees.

2. A motor-driven power steering apparatus as claimed in claim 1, wherein an involute gear in which a tooth profile is formed in such a manner that a pressure angle is increased from a tooth top of the gear to a tooth root is employed for one or both of said drive gear and said driven gear.

3. A motor-driven power steering apparatus as claimed in claim 1, wherein an involute gear in which a crowning process is applied in a direction of a tooth trace is employed for one or both of said drive gear and said driven gear.

4. A motor-driven power steering apparatus as claimed in claim 2, wherein an involute gear in which a crowning process is applied in a direction of a tooth trace is employed for one or both of said drive gear and said driven gear.

* * * * *